United States Patent [19]

Luallin et al.

[11] Patent Number: 5,010,455

[45] Date of Patent: Apr. 23, 1991

[54] HEADLAMP ASSEMBLY

[75] Inventors: John M. Luallin; William E. Nagengast; Robert G. Roeske, all of Anderson, Ind.

[73] Assignee: General Motors Corporation, Detroit, Mich.

[21] Appl. No.: 520,314

[22] Filed: May 7, 1990

[51] Int. Cl.[5] .............. B60Q 1/00

[52] U.S. Cl. .............. 362/61; 362/80; 362/226

[58] Field of Search .............. 362/61, 80, 226, 374, 362/375

[56] References Cited

U.S. PATENT DOCUMENTS

| | | | |
|---|---|---|---|
| 4,682,274 | 7/1987 | Freudenreich et al. | 362/226 |
| 4,794,500 | 12/1988 | Bradley | 362/226 |
| 4,819,142 | 4/1989 | Lothamer | 362/226 |
| 4,841,419 | 6/1989 | Ohishi | 362/226 |

*Primary Examiner*—Ira S. Lazarus
*Assistant Examiner*—Sue Hagarman
*Attorney, Agent, or Firm*—Edward J. Biskup

[57] ABSTRACT

A vehicle headlamp assembly having a retainer of a replaceable light bulb assembly that includes three circumferentially spaced sections each independently attached to the rear of the reflector and located around the opening which receives the light bulb of the light bulb assembly.

3 Claims, 2 Drawing Sheets

HEADLAMP ASSEMBLY

This invention concerns headlamps and more particularly relates to a vehicle headlamp having a retainer arrangement for maintaining a replaceable light bult within a socket formed in the rear of a headlamp reflector.

More specifically, the vehicle headlamp according to the present invention includes a plastic reflector formed with a a parabolic reflecting surface and a circular opening located in said reflecting surface for receiving the light bulb of a replaceable light bulb assembly which has a collar formed with three circumferentially spaced ears projecting radially outwardly therefrom. The light bulb assembly is adapted to be maintained in a predetermined position relative to the circular opening and the reflecting surface by a retainer which includes three separate circumferentially spaced retainer sections surrounding said circular opening. In the preferred form each of the retainer sections is generally arcuate in configuration and has a pair of axially extending legs integrally formed with the rear of the reflector. A bridge member interconnects the legs of each of the retainer sections and has ramp portion formed thereon. In addition, each of the retainer sections is formed with a cutout portion for receiving one of the ears of the light bulb assembly. Also, at least one of the retainer sections has a stop surface so when the ears of the light bulb assembly are inserted into the cutout portions and the light bulb assembly is rotated, the ears initially contact the ramp of each bridge member so as to cause the associated bridge member to flex axially outwardly relative to the circular opening and upon continued rotation of the light bulb assembly one of the ears engages the stop surface after which the bridge member of each of the retainer sections serves to press the light bulb assembly inwardly towards the circular opening to orient the filament of the light bulb axially with respect to the reflecting surface.

In a modified form of the invention, the cut out portions are formed at the opposed ends of each of the retainer sections so that during light bulb insertion into the circular opening, the ears of the light bulb assembly are located between each adjacent pair of retainer sections rather within a retainer section as permitted by the above described retainer arrangement.

The following patents and patent applications show headlamp assemblies which include retainers for replaceable light bulbs that, although different structurally, serve to support and position a light bulb assembly that is the same as that supported by the present invention:

| Patent No. | Title No. | Issued |
|---|---|---|
| U.S. Pat. No. 4,829,408 | Retainer for Replaceable Headlamp Bulb | May 9, 1989 |
| U.S. Pat. No. 4,819,142 | Vehicle Lamp Assembly | April 4, 1989 |
| U.S. Pat. No. 4,819,133 | Replaceable Headlamp Assembly | April 4, 1989 |
| U.S. Pat. No. 4,794,500 | Composite Headlamp Bulb Retaining Mechanism | Dec. 27, 1988 |
| U.S. Pat. No. 4,774,645 | Replaceable Lamp Bulb Assembly | Sept. 27, 1988 |
| U.S. Pat. No. 4,747,029 | Headlamp Assembly | May 24, 1988 |
| U.S. Pat. No. 4,682,274 | Automotive Headlight | July 21, 1987 |
| U.S.S.N. 394,918 | Headlamp Assembly | Filed Aug. 17, 1989 |

-continued

| Patent No. | Title No. | Issued |
|---|---|---|
| U.S.S.N. 430,831 | Headlamp Assembly | Filed Oct. 10, 1989 |

The objects of the present invention are to provide a new and improved vehicle headlamp having a retainer for a replaceable light bulb assembly that is integrally formed with the rear of the reflector at the time that the reflector is molded; to provide a new and improved vehicle headlamp having a retainer that consists of three segmented sections which are adapted to receive and maintain in a fixed position the three ears of a replaceable light bulb assembly; to provide a new and improved vehicle headlamp that has a retainer for a replaceable light bulb assembly that includes three separate sections surrounding the lamp bulb opening in the reflector and in which each of the sections has a cut out portion for receiving one of the ears of the replaceable light bulb assembly; and to provide a new and improved headlamp assembly having a replaceable light bulb assembly retainer arrangement located on the rear of the reflector and in which the retainer arrangement is divided into three segments each of which has the opposite ends thereof cooperating with the opposite ends of adjacent segments of the retainer arrangement for locating and receiving the ears of the light bulb assembly so when the latter is rotated, each of the segments receives an ear and serves to maintain the light bulb assembly in a locked position relative to the reflector.

Other objects and advantages of the present invention will be apparent from the following detailed description when taken with the drawing in which FIG. 1 is a perspcctive view showing a headlamp assembly made in accordance with the present invention;

Figure 1:
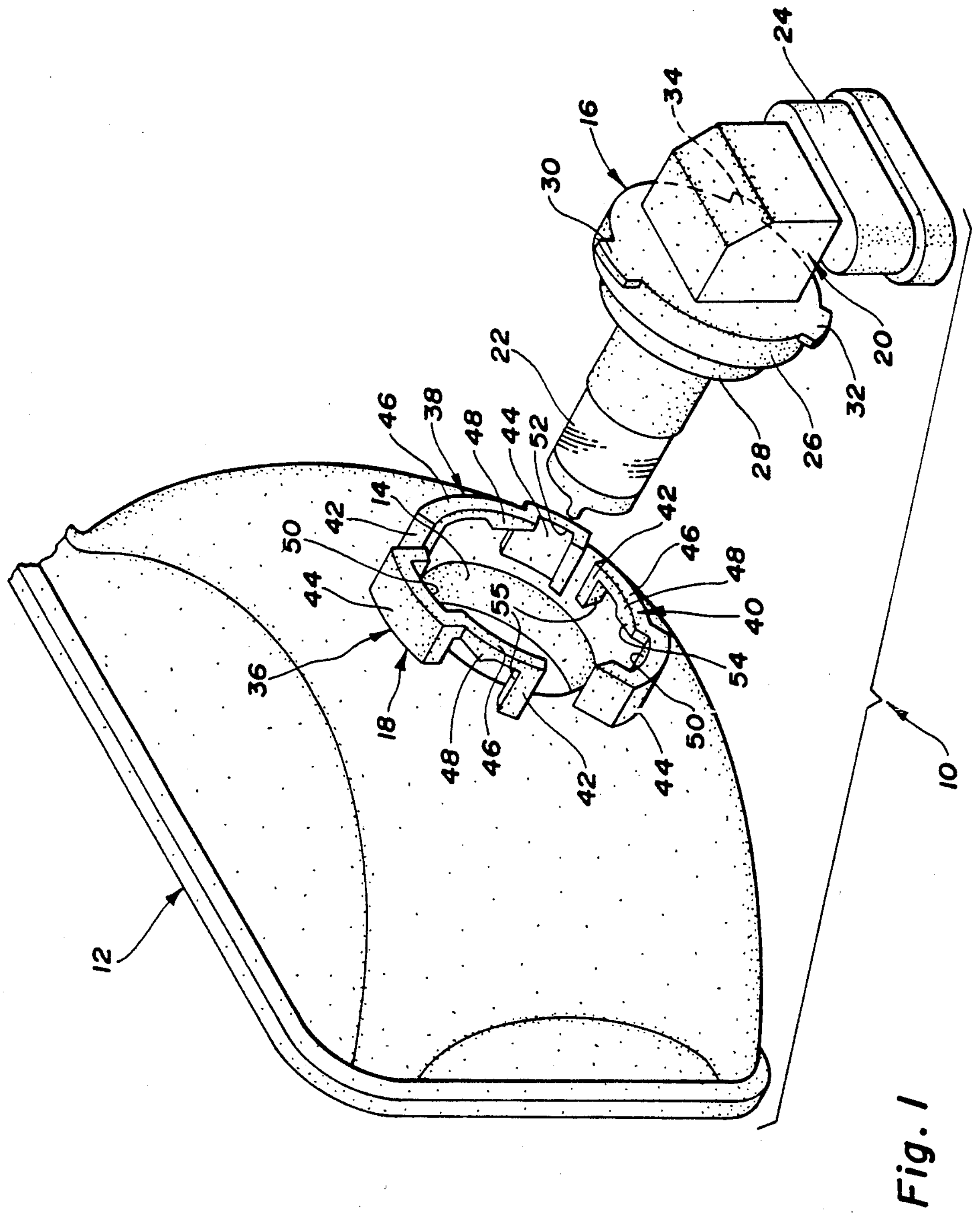
Figure 2:
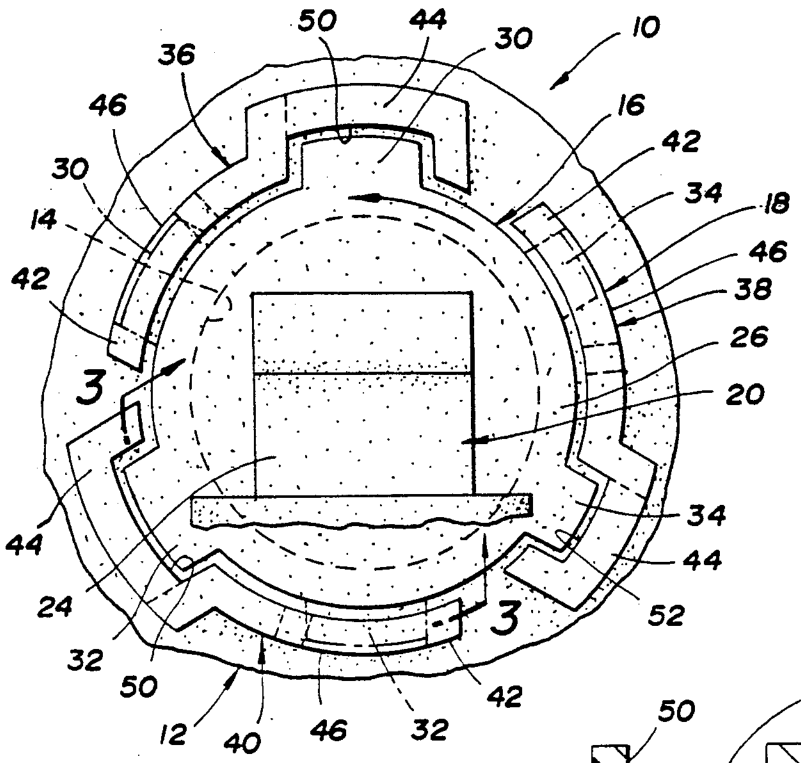
FIG. 2 is a plan view showing the retainer located at the rear of the reflector of the headlamp assembly of FIG. 1.

Referring now to the drawings and more particularly FIGS. 1 and 2 thereof, a vehicle headlamp assembly 10 made in accordance with the present invention is shown having a reflector 12 made of plastic and provided with the usual low beam cavity having an aluminized parabolic reflecting surface (not shown). The rear of the the reflector 12 is formed with a circular opening or socket 14 which is adapted to receive a replaceable low beam light bulb assembly 16, which as seen in FIG. 2, is supported by and maintained in a locked position on the reflector 12 by a retainer 18 to be described hereinafter.

The retainer 18 is intended to receive and position either a type HB3 or HB4 standardized replaceable light bulb assembly approved for use by U.S. Motor Vehicle Safety Standard 108. In this regard, the light bulb assembly 16 is of this type and as seen in FIGS. 1 and 2 includes a base portion 20 made of insulating material, such as plastic, that receives and supports a wedge-type glass capsule or light bulb 22. The base portion 20 of the light bulb assembly 16 includes a 90 degree angled connector portion 24 that electrically connects to the plug end of a wire harness (not shown) of a motor vehicle for providing electrical current to the filament of the light bulb 22. The base portion 20 is also integrally formed with a collar 26 having an outer diameter larger than the diameter of the opening 14 formed in the reflector. A neck portion 28, integrally formed with the collar 26, carries an "O" ring (not shown) which mates with the inner wall of the opening 14 to assure a snug fit is provided between the neck portion 28 and the opening 14. It will be noted that the collar 26 is integrally formed with three radially outwardly extending and circumferentially spaced ears 30, 32, and 34. The ears 30 and 32 are identical in size and configuration while the ear 34 is smaller in size and assures that the light bulb assembly 16 is properly located within the retainer 18.

Figure 3:
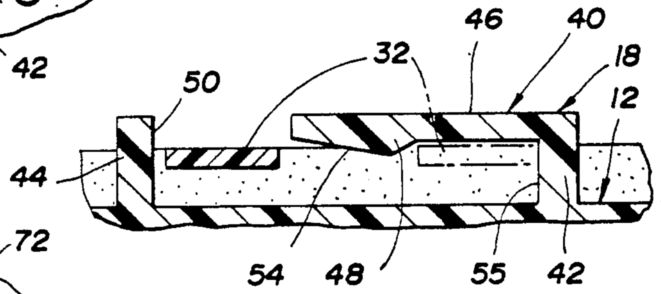
FIG. 3 is a sectionai view taken on line 3—3 of FIG. 2.

As best seen in FIGS. 1-3, the retainer 18 includes three segmented sections 36, 38 and 40 which are integrally formed on the rear of the reflector 12 and surround the opening 14. Each of the retainer sections 36–40 is arcuate in configuration and has the opposite ends thereof formed with axially extending legs 42 integrally formed with the rear of the reflector 12. A bridge member 46 interconnects the legs 42 and 44 of each of the retainer sections 36–40, and as seen in FIG. 3, a ramp portion 48 is formed with each of the bridge members. In addition, the retainer sections 36 and 40 are each formed with a retainer ear access slot or cutout portion 50 that is identical in shape and size for purposes of accommodating the ears 30 and 32 of the light bulb assembly 16. The retainer section 38 similarly is formed with a retainer ear access slot or cutout portion 52, however, in this case, the cutout portion 52 is sized and shaped so as to accommodate the ear 34 which, as aforementioned, is smaller in size than the ears 30 and 32. Thus, the size and shape of the cutout portions 50 and 52 assure that the light bulb assembly 16 is properly received by and rotatably located within the opening 14 when manually inserted therein.

It should be apparent from the above description, that when the light bulb assembly 16 is inserted into the opening 14, the ears 30–34 are aligned with and located within the cutout portions 50 and 52, and afterwards, the body portion 20 of the light bulb assembly is rotated counterclockwise as seen in FIG. 2 causing each ear 30–34 to initially contact the tapered portion (such as portion 55 of ramp portion 48 seen in FIG. 3) of the associated ramp portion causing the bridge member 46 on which the ramp portion 48 is formed to flex axially rearwardly, i.e., away from the opening 14. As the body portion 20 continues to be rotated in a counterclockwise direction, each ear 30–34 will move over the apex of the associated ramp portion 48 into a seated or locked position (shown in phantom lines in FIG. 3) at which time the bridge member 46 acts as a spring to press the associated ear of the light bulb assembly 16 and, accordingly, the collar 26 thereof into firm contact with the reflector 12. At this point, the body portion 20 of the light bulb assembly 16 will be restrained from further counterclockwise rotation due to the ear 32 contacting the stop surface 55 formed on the leg 42 as seen in FIG. 2. The ears 30–34 of the light bulb assembly 16 will then assume the phantom line position shown in FIG. 2, and the light bulb assembly 16 is prevented from further counterclockwise movement by the stop surface 55 of each leg 42 and proper orientation of the filament of light bulb 22 along the X, Y and Z axes relative to the reflecting surface of the reflector 12 is attained.

Figure 4:
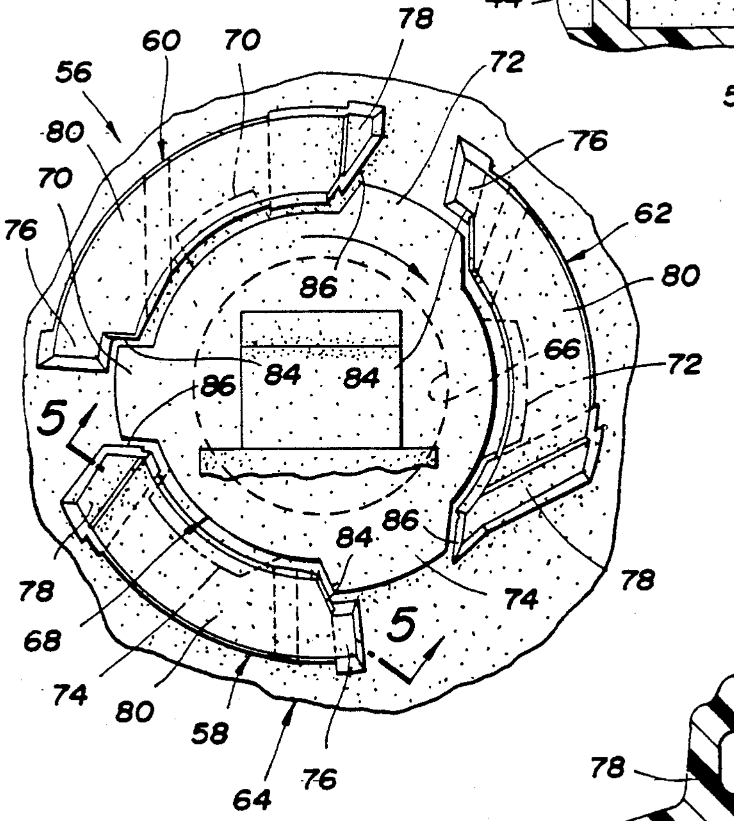
FIG. 4 is a plan view of the rear of a headlamp reflector showing a modified form of the retainer of FIGS. 1-3.
Figure 5:
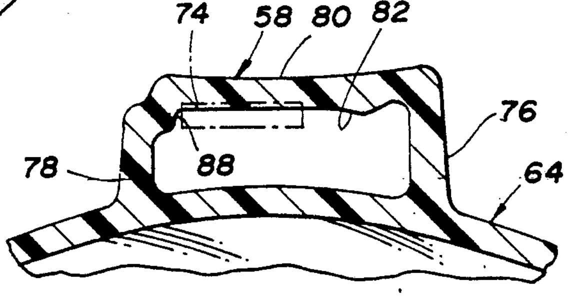
FIG. 5 is a sectional view taken on line 5—5 of FIG. 4.

FIGS. 4 and 5 show a modified form of the retainer 18 seen in FIGS. 1-3. As seen in FIG. 4, this retainer identified by reference numeral 56 also consists of three segmented sections 58, 60, and 62 which are integrally formed on the rear of a reflector 64 which is the same as reflector 12. The retainer sections 58–62 surround an opening 66 formed in the reflector 64 for receiving a lamp bulb assembly 68 which is generally the same in construction as the light bulb assembly 16 except that the lamp bulb is intended to be inserted within the reflector highbeam cavity which would normally adjoin the low beam cavity seen in FIG. 1. Accordingly, in order to prevent the high beam light bulb assembly 68 from being inadvertently placed in the wrong cavity of a two cavity reflector, the ears 70, 72 and 74 of the light bulb assembly 68 are slightly varied in design relative to the ears 30–34 of the light bulb assembly 16.

As in the case of the retainer 18, each retainer section 58–62 of retainer 56 is arcuate in configuration and has the opposite ends thereof formed with axially extending legs 76 and 78 integrally formed with the rear of the reflector 64. Also, a bridge member 80 interconnects the legs 76 and 78 of each of the retainer sections 58–62, and as seen in FIG. 5, a ramp portion 82 is formed with each of the bridge members 80. However, rather than having cutout portions in one of the legs as provided in the retainer 18 for accommodating the ears of the light bulb assembly, each retainer section 58–62 has cutout portions 84 and 86 at the opposed ends thereof adjacent each leg 74 and 78. As with the cutout portions 50 and 52 in the retainer sections 36–40 of the retainer 18, the cutout portions 84 and 86 are sized and shaped so as to receive the light bulb assembly 68 only if inserted into the opening with the ears 70–74 positioned as seen in FIG. 4. Thus, the cutout portions at the opposed ends of adjacent retainer sections cooperate with each other to provide an access space for the appropriate ear of the light bulb assembly 68. In this regard and as with the light bulb assembly 16, the ears 72 and 74 of the light bulb assembly 68 are identical in size and shape while the ear 70 is smaller in size. Accordingly, the adjacent cutout portions 84 and 86 of each retainer section 58–62 are appropriately sized and positioned to receive the light bulb assembly 68 as seen in FIG. 4. Once the light bulb assembly 68 is positioned as seen in FIG. 4, the body portion thereof is rotated clockwise causing each ear 70–74 to move over the apex of the associated ramp portion 82 causing the bridge member 80 to act as a spring and to press the associated ear and, accordingly, the collar of the light bulb assembly 68 into firm contact with the reflector 64. Each ear 70–74 will then engage the stop surface 88 seen in FIG. 5 at which point further clockwise rotation of the light bulb assembly 68 will be prevented and the ears 70–74 will assume the phantom line positions shown.

Various changes and modifications can be made in this construction without departing from the spirit of the invention. Such changes and modifications are contemplated by the inventors and they do not wish to be limited except by the scope of the appended claims.

The embodiments of the invention in which an exlcusive property or privilege is claimed are defined as follows:

1. In combination, a vehicle headlamp assembly including a plastic reflector formed with a parabolic reflecting surface and a circular opening in said reflecting surface and adapted to receive the light bulb of a replaceable light bulb assembly from the rear of said reflector, said replaceable light bulb assembly having a collar and three circumferentially spaced ears projecting radially outwardly therefrom, a retainer integrally formed on the rear of said reflector during the molding of said reflector for receiving said ears and for maintaining said light bulb assembly in a predetermined position relative to said circular opening, said retainer comprising three separate and physically separated circumferentially retainer sections surrounding said circular opening of said reflector, the opposite ends of each of said retainer sections having an axially extending leg integrally formed with the rear of said reflector, a bridge member integrally formed with and interconnecting the legs of each of said retainer sections and having a ramp portion formed thereon, each of said retainer sections receiving one of said ears, a stop surface in at least one of said retainer sections, the arrangement being such that upon said retainer sections receiving said ears of said light bulb assembly the latter is thereafter rotated to cause each of said ears to move into initial contact with said ramp portion of each of said retainer sections so as to cause the bridge member to initially flex axially outwardly relative to said circular opening and upon continued rotation of said light bulb assembly one of said ears engages said stop surface after which said bridge member of each of said retainer sections serves to press said light bulb assembly inwardly towards said circular opening to orient said light bulb axially with respect to said reflecting surface.

2. In combination, a vehicle headlamp assembly including a plastic reflector formed with a parabolic reflecting surface and a circular opening in said reflecting surface and adapted to receive the light bulb of a replaceable light bulb assembly from the rear of said reflector, said replaceable light bulb assembly having a collar and three circumferentially spaced ears projecting radially outwardly therefrom, a retainer integrally formed on the rear of said reflector during the molding of said reflector for receiving said ears and for maintaining said light bulb assembly in a predetermined position relative to said circular opening, said retainer comprising three separate and physically separated circumferentially retainer sections surrounding said circular opening of said reflector, the opposite ends of each of said retainer sections having an axially extending leg integrally formed with the rear of said reflector, a bridge member integrally formed with and interconnecting the legs of each of said retainer sections and having a ramp portion formed thereon, each of said retainer sections having a cutout portion for receiving one of said ears, a stop surface in at least one of said retainer sections, said cutout portions upon receiving said ears of said light bulb assembly permitting the latter to be rotated into initial contact with said ramp of each retainer section so as to cause the associated bridge member to flex axially outwardly relative to said circular opening and upon continued rotation of said light bulb assembly to engage said stop surface after which said bridge member of each of said retainer sections serves to press said light bulb assembly inwardly towards said circular opening to orient said light bulb axially with respect to said reflecting surface.

3. In combination, a vehicle headlamp assembly including a plastic reflector formed with a parabolic reflecting surface and a circular opening in said reflecting surface and adapted to receive the light bulb of a replaceable light bulb assembly from the rear of said reflector, said replaceable light bulb assembly having a collar and three circumferentially spaced ears projecting radially outwardly therefrom, a retainer integrally formed on the rear of said reflector during the molding of said reflector for receiving said ears and for maintaining said light bulb assembly in a predetermined position relative to said circular opening, said retainer comprising three separate and physically separated circumferentially retainer sections surrounding said circular opening of said reflector, the opposite ends of each of said retainer sections having an axially extending leg integrally formed with the rear of said reflector, a bridge member integrally formed with and interconnecting the legs of each of said retainer sections and having a ramp portion formed thereon, each of said retainer sections having a cutout portion at the opposed ends thereof for receiving one of said ears, a stop surface in at least one of said retainer sections, said cutout portions of adjacent retaining sections cooperating with each other for receiving said ears of said light bulb assembly so as to permit the latter to be rotated into initial contact with said ramp of each retainer section and cause the associated bridge member to flex axially outwardly relative to said circular opening and upon continued rotation of said light bulb assembly to engage said stop surface after which said bridge member of each of said retainer sections serves to press said light bulb assembly inwardly towards said circular opening to orient said light bulb axially with respect to said reflecting surface.

* * * * *